(12) United States Patent
Accapadi et al.

(10) Patent No.: US 7,380,247 B2
(45) Date of Patent: May 27, 2008

(54) SYSTEM FOR DELAYING PRIORITY BOOST IN A PRIORITY OFFSET AMOUNT ONLY AFTER DETECTING OF PREEMPTION EVENT DURING ACCESS TO CRITICAL SECTION

(75) Inventors: Jos Manuel Accapadi, Austin, TX (US); Andrew Dunshea, Austin, TX (US); Dirk Michel, Austin, TX (US); James W. Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 10/626,192

(22) Filed: Jul. 24, 2003

(65) Prior Publication Data
US 2005/0022186 A1    Jan. 27, 2005

(51) Int. Cl.
G06F 13/18 (2006.01)
G06F 13/00 (2006.01)

(52) U.S. Cl. .................. 718/103; 711/112; 710/241
(58) Field of Classification Search ............ 718/103, 718/108; 710/241; 707/9, 8; 711/158, 112
See application file for complete search history.

(56) References Cited

U.S. PATENT DOCUMENTS

| 4,418,385 A | * | 11/1983 | Bourrez | 710/241 |
|---|---|---|---|---|
| 5,220,653 A | | 6/1993 | Miro | 395/275 |
| 5,247,675 A | | 9/1993 | Farrell et al. | 395/650 |
| 5,333,319 A | * | 7/1994 | Silen | 718/103 |
| 5,428,789 A | | 6/1995 | Waldron, III | 395/700 |
| 5,469,560 A | * | 11/1995 | Beglin | 711/112 |
| 5,515,538 A | | 5/1996 | Kleiman | 395/733 |
| 5,630,128 A | | 5/1997 | Farrell et al. | 395/673 |
| 5,752,031 A | | 5/1998 | Cutler et al. | 395/673 |

(Continued)

FOREIGN PATENT DOCUMENTS

JP        11327921        11/1999

OTHER PUBLICATIONS

Fiske et al., "Thread Prioritization: a thread scheduling mechanism for multiple-context parallel processors," High-Performance Computer Architecture, Jan. 1995, p. 210-221.

(Continued)

*Primary Examiner*—Meng-Al T. An
*Assistant Examiner*—MengYao Zhe
(74) *Attorney, Agent, or Firm*—Van Leeuwen & Van Leeuwen; John D. Flynn

(57) ABSTRACT

A system and method is provided for delaying a priority boost of an execution thread. When a thread prepares to enter a critical section of code, such as when the thread utilizes a shared system resource, a user mode accessible data area is updated indicating that the thread is in a critical section and, if the kernel receives a preemption event, the priority boost that the thread should receive. If the kernel receives a preemption event before the thread finishes the critical section, the kernel applies the priority boost on behalf of the thread. Often, the thread will finish the critical section without having to have its priority actually boosted. If the thread does receive an actual priority boost then, after the critical section is finished, the kernel resets the thread's priority to a normal level.

3 Claims, 5 Drawing Sheets

U.S. PATENT DOCUMENTS

| | | |
|---|---|---|
| 5,937,187 A | 8/1999 | Kosche et al. ............... 395/674 |
| 5,946,466 A | 8/1999 | Adiga et al. ........... 395/200.61 |
| 6,108,683 A | 8/2000 | Kamada et al. ............. 709/103 |
| 6,212,544 B1 | 4/2001 | Borkenhagen et al. ...... 709/103 |
| 6,263,359 B1 | 7/2001 | Fong et al. ................. 709/103 |
| 2001/0056456 A1 | 12/2001 | Cota-Robles ............... 709/103 |
| 2002/0078119 A1 | 6/2002 | Brenner et al. ............. 709/102 |
| 2002/0124042 A1 | 9/2002 | Melamed et al. ........... 709/102 |
| 2002/0129227 A1 | 9/2002 | Arakawa .................... 712/228 |
| 2002/0178208 A1 | 11/2002 | Hutchison et al. .......... 709/102 |
| 2002/0184290 A1 | 12/2002 | Olszewski et al. .......... 709/102 |
| 2006/0037025 A1* | 2/2006 | Janssen et al. .............. 718/107 |

OTHER PUBLICATIONS

"Deterministic Priority Inversion Method for Personal Computers," IBM Technical Disclosure Bulletin, May 1995, vol. 38, No. 05, p. 271-276.

"Providing an Application with Limited Control of Preemption," IBM Technical Disclosure Bulletin, Sep. 1995, vol. 38, No. 09, p. 187-188.

"Lock priority boosting in an MP system with multiple run queues," IBM Research Disclosure, Jan. 2001, p. 174.

* cited by examiner

SYSTEM FOR DELAYING PRIORITY BOOST IN A PRIORITY OFFSET AMOUNT ONLY AFTER DETECTING OF PREEMPTION EVENT DURING ACCESS TO CRITICAL SECTION

BACKGROUND OF THE INVENTION

1. Technical Field

The present invention relates in general to a system and method for delaying a priority boost for a processing thread. More particularly, the present invention relates to a system and method to boost certain threads only when the thread is about to be preempted.

2. Description of the Related Art

Modern computer systems perform multiple tasks seemingly at the same time. Using multitasking, the processor handles instructions from multiple processes by servicing the processes in a round-robin fashion. In this manner, a process is executed by the processor for a small amount of time before it is time sliced, it's settings and register values saved, a different process is executed by the processor. These processes, or "threads," are a stream of instructions corresponding to one or more software applications that require handling by the processor. The terms "process" and "thread" are used herein interchangeably to note a stream of executable instructions that is executed by a processor. By quickly moving from one process to the next, it appears that each process is executed simultaneously.

The operating system regulates access to the processor. Most operating systems employ priority-based scheduling algorithms for this purpose. Priorities are assigned to programs according to the importance and/or urgency of the functions that are performed on behalf of the computer system. The operating system uses these priorities to determine when and for how long a process or unit of executable code within the programs (hereafter, "thread" or "process") is granted access to the processor. Generally, priority-based scheduling allocates processor time to optimize the computer system's performance. For example, the computer system may be optimized in order to minimize user input response time, maximize throughput, and/or guarantee predictable, or deterministic, execution times for application programs.

Many resources within a computer system are shared by the various programs being executed by the processor. In many cases, these resources need to be serialized so that only one process is using the resource in any given time. In order to serialize access to the resource, software locks are often used. When a resource is being used by another process, a process will wait on the lock. When the lock is released by the other process, the process will attempt to acquire the lock. Other processes will be unable to use the resource until the process releases the lock. Because of this serialization, efficient use of shared resources helps improve overall system throughput. This is especially true of resources and corresponding locks that are used by many processes.

In an operating system using a priority-based scheduling algorithm, a process with an inferior priority may be preempted by a process of the superior priority. This is true even when the inferior priority process currently possesses a critical resource. To address this problem, a thread will often request a priority boost, or increase, before entering a critical section of code during which the thread will often be using a shared resource controlled by a lock. When the thread is finished with the critical section of code, the lock is released and the thread's priority is reset (un-boosted) by the operating system. A challenge of this approach, however, is that the thread takes time to request the priority level changes (both to boost and un-boost) and also requires the services of and further burdens the operating system. This time is taken even though, in many situations, the thread would not have been preempted even if its priority had not been changed. However, many processes cannot risk the chance that their thread will be preempted during a critical section, so the process boosts and un-boosts the thread's priority.

FIG. 1 is a high level flowchart showing how priority boosts are handled in prior art systems when a thread enters a critical section. User thread processing commences at 100 whereupon, at some point, the user thread prepares to enter a critical section of code and requests a priority boost (step 110) to reduce the chances of the thread being preempted while performing the critical section. Kernel processing (i.e., the scheduler) commences at 120 whereupon, at step 130, the kernel process receives the priority boost request from the user thread and updates priority data structure 140 accordingly.

Upon receiving the priority boost, the user thread performs the critical section at step 150. After the critical section is completed, the user thread prepares to exit the critical section and, at step 160, requests that its priority be reset to its normal level. User processing thereafter ends at 180.

Kernel process 120 receives the second priority change request from the user thread at step 170 and updates thread data structures included in priority data 140 accordingly. Kernel processing thereafter ends at 190.

As can be seen by the processing shown in FIG. 1, the user thread made two requests to the kernel process in order to boost and, subsequently, reset its priority. If no other threads would have preempted the user thread during performance of the critical section, then both requests to the kernel process were not needed. However, a not inconsequential number of times, the user thread may have been preempted, so in the prior art the user thread is forced to make such requests of the kernel process to guard against being preempted. In addition, preemption often occurs as a result of time-slicing whereupon the waiting thread has the same priority (i.e., another user thread) as the thread currently running on the CPU. Preemption in favor of another thread with the same priority indicates that even a small priority boost is helpful for the currently-running thread to complete processing the critical section. However, even a small priority boost is costly in terms of the user level thread having to make two kernel process requests and the kernel process needing to handle both requests.

What is needed, therefore, is a system and method for delaying the priority boost of a thread until such time as the thread is about to be preempted. What is further needed is a system and method for limiting requests made by a thread to a kernel process to boost and reset its priority.

SUMMARY

It has been discovered that the aforementioned challenges are resolved using a system and method that boosts a thread's priority when the thread is about to be preempted. In this manner, if the thread would not have been preempted, the priority boost is not performed saving the kernel level processing required to boost the thread's priority and, subsequently, reset the thread's priority to its previous level.

When a user (i.e., non-kernel) thread is preparing to enter a critical section of code, flags are set in a user accessible data structure indicating that the thread is currently in a critical section of code. A critical section of code is a section where it would be detrimental to preempt the currently running thread, such as when the currently-running thread has acquired a critical latch. For example, a database thread that is currently updating a page of data in a buffer pool which requires the thread to hold a critical latch. Because the thread is a user-level thread, interrupts would typically be enabled allowing the thread to be preempted. However, if the thread was preempted while holding the critical latch, other threads that also need the resource controlled by the latch would be blocked until the thread holding the latch is eventually swapped in by the operating system, completes its critical section of code, and releases the latch.

A kernel process, such as a scheduler, is continuously running and monitoring threads that are running. The kernel process determines whether the currently-running thread should be preempted (i.e., tasked out) based upon a variety of factors such as the amount of CPU time the currently-running thread has been running on the CPU and whether another thread with equal or greater priority is waiting for the CPU.

The kernel process determines that the currently-running thread should be preempted. Before preempting the thread, however, the kernel process reads the user accessible data structure to determine whether the currently-running thread has requested a delayed priority boost (i.e., by indicating that the currently-running thread has entered a critical section of code). Data in the user level data structure indicates the amount of priority boost the thread requires. Upon determining that the currently-running thread is in a critical section and has requested a priority boost, the kernel process performs the priority boost on behalf of the currently-running thread. The thread's new priority is now used to determine whether the thread should still be preempted. If the thread waiting to execute has a lower priority, then the currently-running thread is not preempted.

When the currently-running thread completes the critical section, the user level data is updated indicating that the thread has completed the critical section. The next time the kernel process checks the currently-running thread, it determines that the thread is no longer in a critical section. The kernel process determines whether a priority increase was performed on behalf of the thread and, if it was, the thread's priority is reset accordingly. Often times, the currently-running thread will indicate that it is in a critical section and the thread will finish the critical section before a preemption event occurs. In these situations, the thread is able to perform the critical section without ever receiving a priority boost, thus saving processing time that would otherwise be used to boost and, subsequently, reset the thread's priority, The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
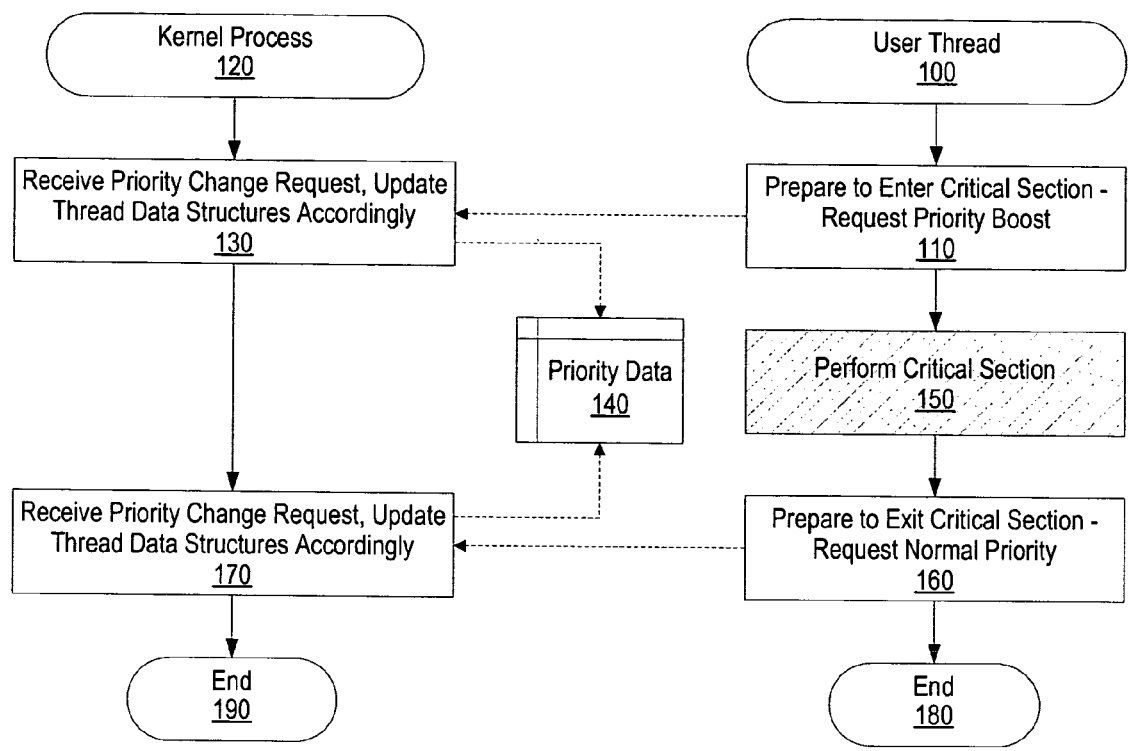
FIG. 1 is a high level flowchart showing how priority boosts are handled in prior art systems when a thread enters a critical section.

FIG. 1 is a high level flowchart showing how priority boosts are handled in prior art systems when a thread enters a critical section. For details regarding FIG. 1, see the description provided in the "background" section, above.

Figure 2:
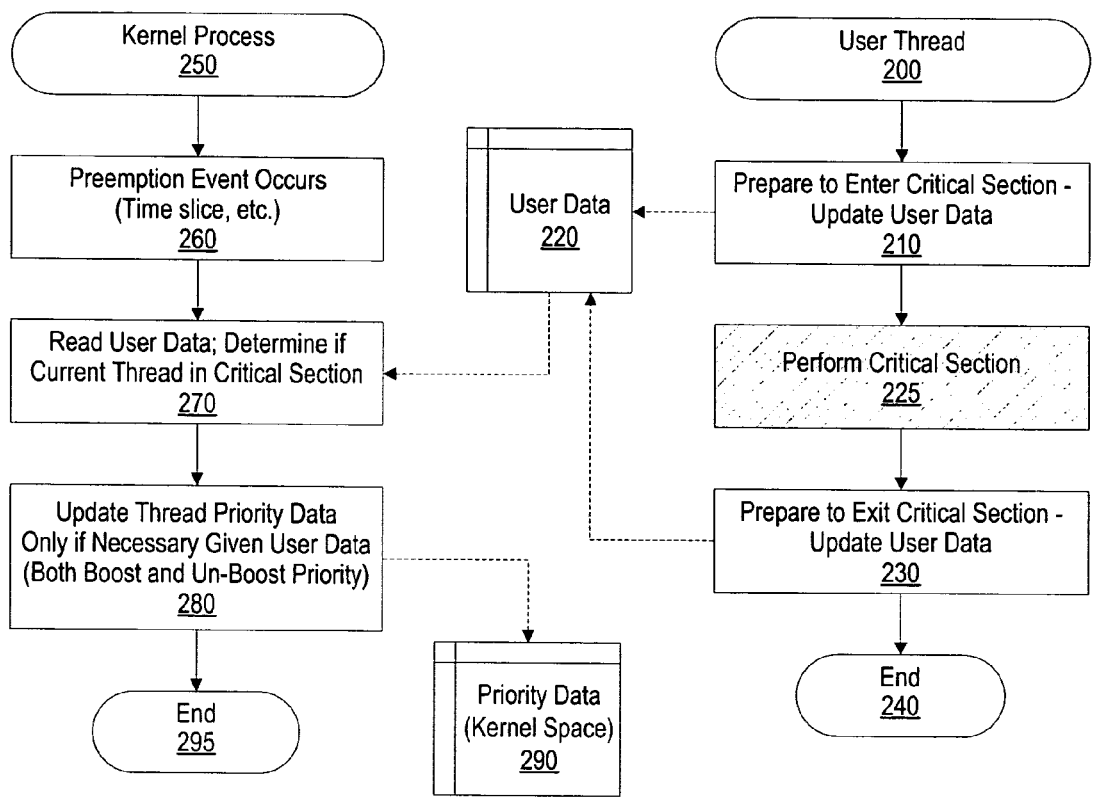
FIG. 2 is a high level flowchart showing steps taken in performing a delayed priority boost.

FIG. 2 is a high level flowchart showing steps taken in performing a delayed priority boost. User thread processing commences at 100 whereupon, at some point, the thread prepares to enter a critical section of code. At step 210, the user thread prepares to enter the critical section of code by updating user level data structure 220, such as a user level structure that includes information about system locks. After writing data to the user level data structure indicating that the user thread is about to perform a critical section of code, the user thread performs the critical section at step 225. At step 230, the user thread prepares to exit the critical section by updating data in user level data structure 220 with data indicating that the user thread is no longer performing a critical section. User processing thereafter ends at 240.

Kernel processing (i.e., a scheduler) continually monitors threads running in the computer system. Various preemption events can be included in the system including a time-slice event whereby, after a certain amount of time, the currently-running thread is preempted in favor of another thread (i.e., a thread with the same priority as the currently-running thread) or when a thread with greater priority is ready for execution. In FIG. 2, kernel processing commences at 250 whereupon, at step 260, a preemption event occurs with regards to user thread 200. The kernel process, at step 270, reads user level data structure 220 that includes information regarding whether the currently-running thread is in a critical section. In step 280, the kernel process may update kernel-maintained priority table 290 with updated priority data for the currently-running thread. If the data in user level data structure 220 indicates that the currently-running thread is in a critical section and has requested a priority boost of "10", then (if the kernel process has not previously boosted the thread's priority) the kernel process boosts the thread's priority in priority data structure 290. Conversely, if the data in user level data structure 220 indicates that the thread is no longer performing the critical section and the kernel process determines that the user thread's priority was boosted at some point, then the kernel process resets ("un-boosts") the thread's priority by the amount it was previously increased (e.g., "10"). Kernel processing of the preemption event thereafter ends at 295.

Figure 3:
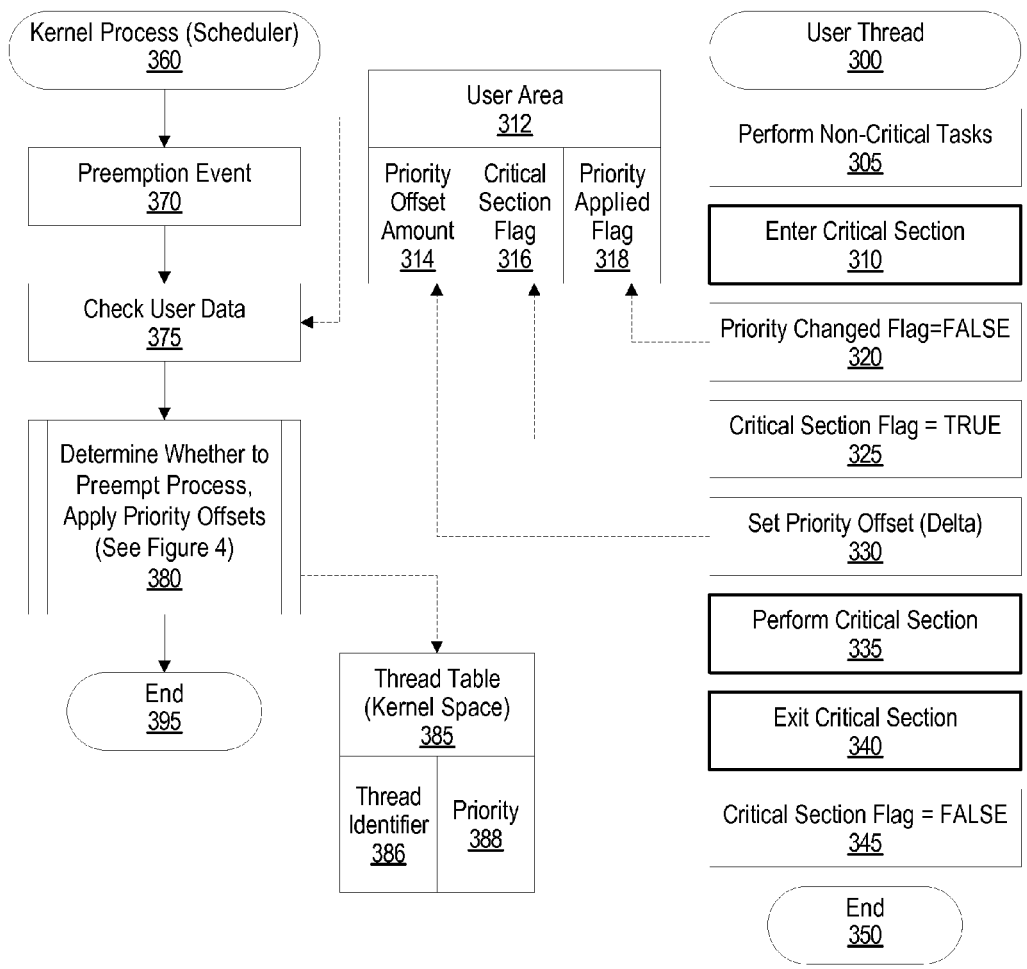
FIG. 3 is a flowchart showing steps taken for a user thread to set user level data indicators that it is in a critical section and how such data is used by the kernel process.

FIG. 3 is a flowchart showing steps taken for a user thread to set user level data indicators that it is in a critical section and how such data is used by the kernel process. User thread processing commences at 300 whereupon the thread performs non-critical tasks 305 before entering critical section of code at 310. Before entering the critical section of code (or upon entering the critical section), data within user level data area 312 are updated. User level data area includes priority applied flag 318 which identifies whether the thread's priority has actually been updated by the kernel process (i.e., the scheduler), critical section flag 316 which identifies whether the thread is currently in a critical section during which a priority boost should be applied, and priority offset amount 314 which stores a value corresponding to the amount of priority boost the thread should receive while in the critical section. User thread sets the priority changed flag to "false" at step 320, indicating that the scheduler has not yet applied the priority boost to the thread. At step 325, the thread sets the critical section flag to "true," indicating that the thread has entered a critical section where the priority boost applies. The amount of the priority boost is set at step 330.

After the priority boost amount and flags have been set in user level data area 312, the thread, at step 335, performs the critical section of code, for example, the thread may be a database thread that is currently updating a page of data in a buffer pool which requires the thread to hold a critical latch. At some point (step 340), the thread exits the critical section of code and, at step 345, sets the critical section flag to "false" indicating that the thread is no longer in a critical section of code. Thread processing thereafter ends at 345.

Kernel processing (i.e., the scheduler) commences at 360 and continually executes to schedule, dispatch, and preempt threads that are running on the processor. At step 370, a preemption event occurs, such as a time-slice event indicating that user thread 300 should be swapped out in favor of a thread with equal or greater priority or such as a higher-priority thread that is ready to execute. Before performing the preemption event, the kernel process reads data from user level data area 312. The kernel process then determines whether to preempt the thread 300 and also applies any necessary priority offsets as indicated by the data set in user level data area 312 (predefined process 380, see FIG. 4 for processing details). During predefined process 380, the kernel process updates data in thread table 385 that includes thread identifiers 386 and priorities 388 corresponding to each thread currently running in the computer system.

Figure 4:
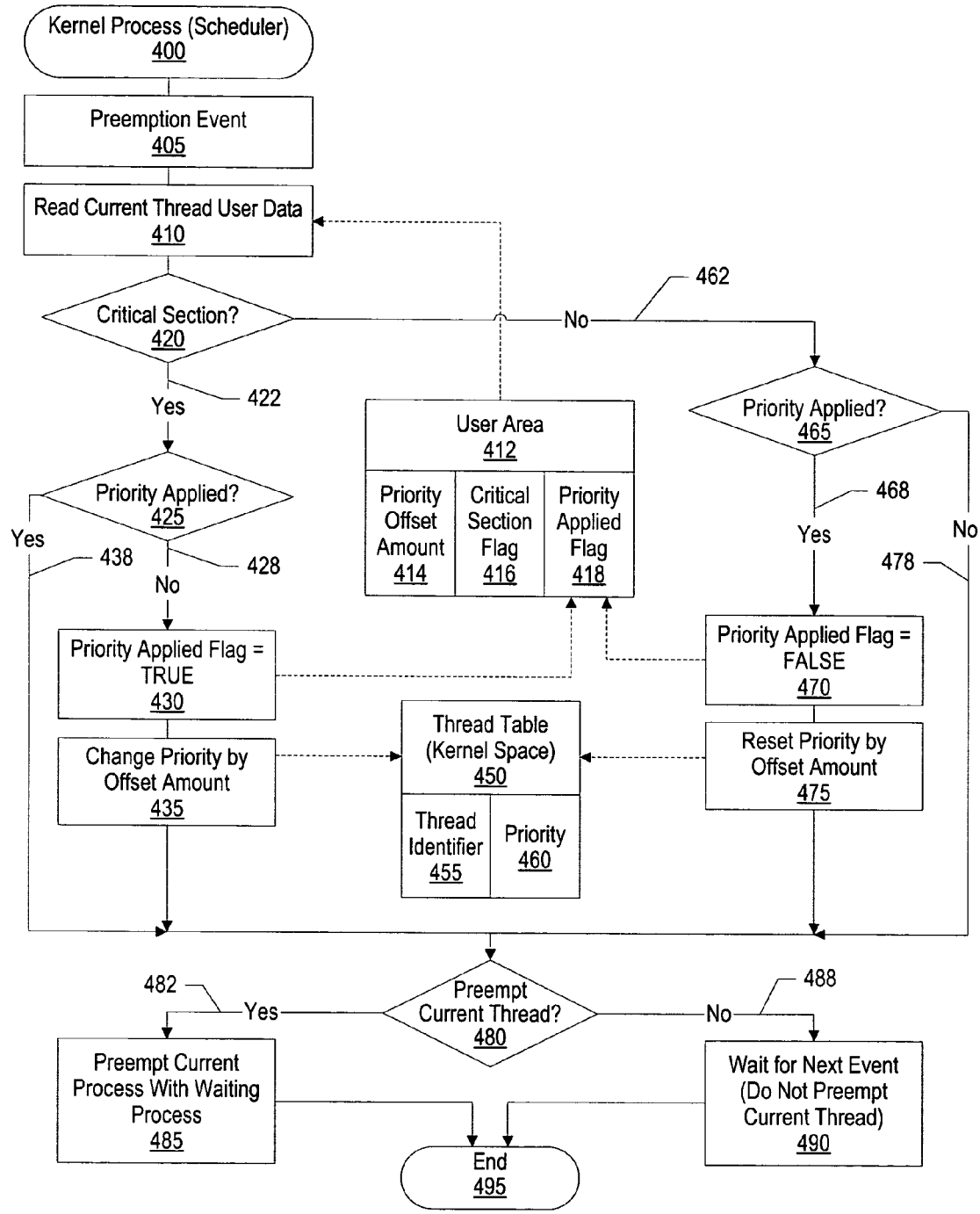
FIG. 4 is a detailed flowchart of steps taken by the kernel process in reading user level data set by the user thread, adjusting the thread's priority if necessary, and determining whether to preempt the thread.

FIG. 4 is a detailed flowchart of steps taken by the kernel process in reading user level data set by the user thread, adjusting the thread's priority if necessary, and determining whether to preempt the thread. FIG. 4 shows the details of predefined process block 380 shown in FIG. 3. In FIG. 4, the kernel process used to determine whether to preempt the thread commences at 400 whereupon a preemption event is detected at step 405. User level data is retrieved, at step 410, corresponding to the currently running thread.

A determination is made, based upon the value of critical section flag 416, as to whether the currently running thread is in a critical section (decision 420). If the currently running thread is in a critical section, decision 420 branches to "yes" branch 422 whereupon another determination is made as to whether the priority boost indicated in the user level data area has already been applied to the currently running thread (decision 425). This determination is based upon priority applied flag 418. If the priority has not yet been applied, decision 425 branches to "no" branch 428 whereupon, at step 430, priority applied flag 418 in user level data area 412 is set to "true," and, at step 435, the currently-running thread's priority is boosted in thread table 450 (a kernel-level data structure) by priority offset amount 414. Priority offset amount 414 was retrieved from user level data area 412. Thread table 450 is updated by the kernel process by locating thread identifier 455 in the table matching the currently running thread's identifier and modifying the thread's priority 460 by the priority offset amount.

Returning to decision 425, if the priority has already been applied, decision 425 branches to "yes" branch 438 bypassing steps 430 and 435.

Returning to decision 420, if the currently running thread is not in a critical section, then decision 420 branches to "no" branch 462, whereupon a determination is made as to whether a priority boost was previously applied to the thread (decision 465, i.e., the priority applied flag is currently "true"). If a priority boost was already applied to the thread, decision 465 branches to "yes"branch 468 whereupon the priority applied flag is reset to "false" at step 470 and the thread's priority in the kernel level thread table is reset by the offset amount at step 475. For example, if the thread's priority was previously increased (boosted) by "10," then step 475 decreases (un-boosts) the thread's priority by 10 as well. In this manner, any penalties that may have been applied to the thread's priority while it was in the critical section are maintained. If the same thread started with a priority of "10" and was boosted, through the processing shown in FIGS. 3 and 4 to "20" (due to a priority offset amount of "10") but, during the execution of the critical section, the scheduler penalized the thread by "2" (so that the thread had a priority of 18), when the un-boosting process occurs, the thread will have a priority of "8," reflecting the penalty that was incurred.

Returning to decision 465, if a priority boost was not applied to the thread (the priority applied flag is "false"), then decision 465 branches to "no" branch 478 bypassing steps 470 and 475 used to reset the priority applied flag and reset (un-boost) the thread's priority.

Regardless of whether the currently executing thread is in a critical section, a determination is made as to whether the thread should be preempted (decision 480). This determination is made despite the occurrence of the preemption event. For example the currently executing thread's priority may have been boosted and, therefore, should not be preempted. Decision 480 is based upon the currently running thread's priority (which may have been boosted) and the priority of any thread that is currently waiting to execute. If the current thread should not be preempted, decision 480 branches to "no" branch 488 whereupon the kernel process waits for the next preemption event (step 490) and does not preempt the thread that is currently executing. When the next preemption event occurs, processing loops back to step 405 to determine whether the currently running thread should have its priority altered and to determine whether to actually preempt the thread. On the other hand, if the current thread should be preempted, decision 480 branches to "yes" branch 482 whereupon the current thread is preempted in favor of a waiting thread at step 485. Processing thereafter ends at 495. Eventually, a preemption event may occur regarding the newly executed thread that was waiting, at which point processing will repeat to determine whether the newly executed thread needs to have its priority adjusted and to determine whether to preempt the thread.

Figure 5:
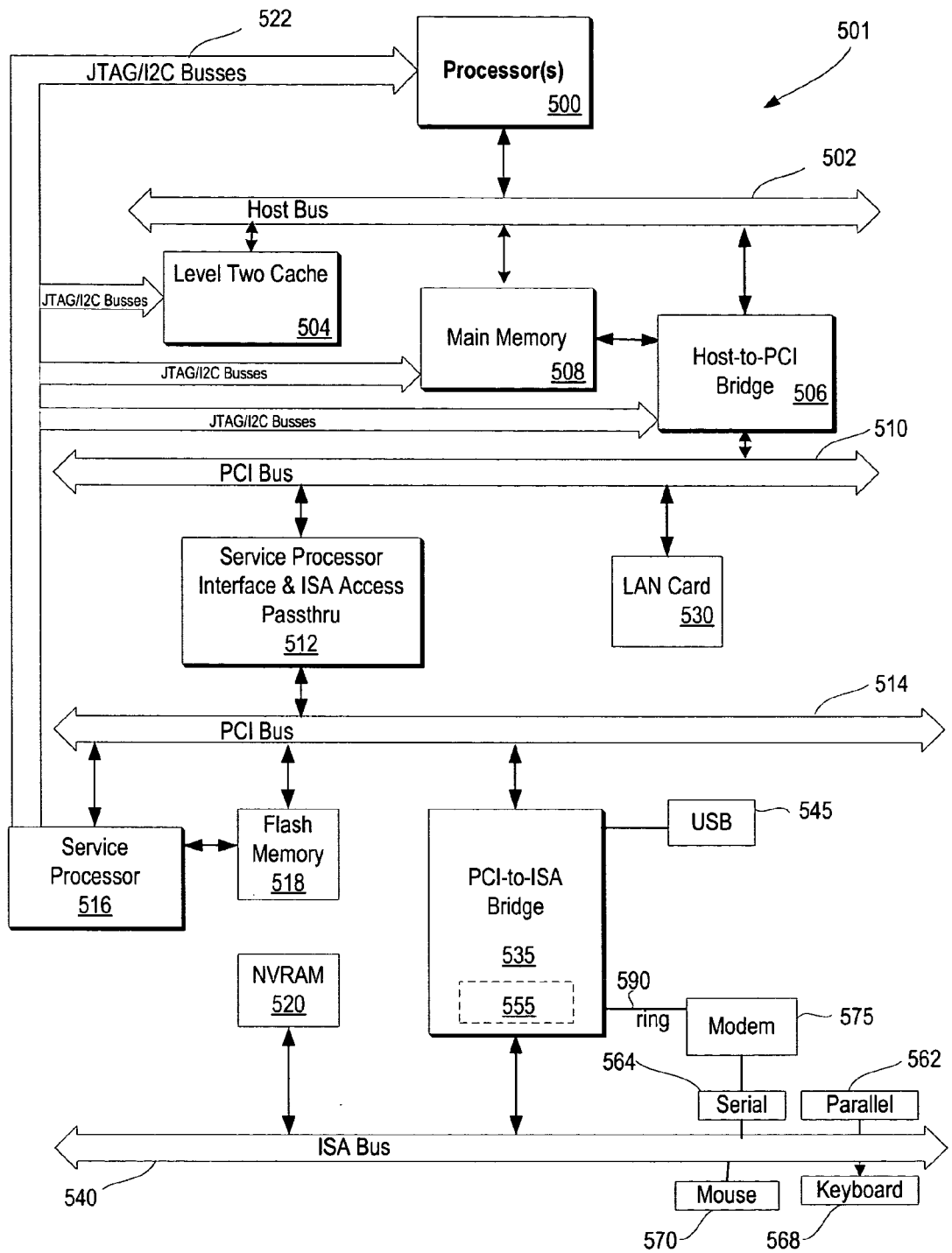
FIG. 5 is a block diagram of a computing device capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for adjusting a priority of an execution thread, said method comprising:
   indicating that the execution thread needs a higher priority by updating a user mode accessible data area, the indicating performed without increasing a priority corresponding to the execution thread and the indicating including setting a critical section flag within the user mode accessible data indicating that the execution thread is entering a critical section of code;
   updating a priority offset amount prior to the execution thread entering the critical section of code, whereupon the priority offset amount is included in the user mode accessible data;
   during execution of the critical section of code:
      detecting a preemption event, wherein the preemption event has a preemption event priority;
      reading the user mode accessible data area in response to the detected preemption event;
      determining whether a priority applied flag and the critical section flag have been set;
      in response to detecting that the critical section flag has been set and the priority applied flag has not been set, raising the execution thread's priority by the priority offset amount and setting the priority applied flag;
      after raising the execution thread's priority:
         in response to the preemption event priority being greater than the execution thread's priority, preempting the execution thread; and
         in response to the preemption event priority not being greater than the execution thread's priority, allowing the execution thread to continue executing.

2. The method of claim 1 further comprising:
   resetting the critical section flag within the user mode accessible data indicating that the execution thread is no longer in the critical section;

receiving a second preemption event;

determining that the critical section flag is no longer set and that the priority applied flag is set;

lowering the execution thread's priority by the priority offset amount in response to the determination that the critical section flag is no longer set and that the priority flag is set; and resetting the priority applied flag indicating that the execution thread's priority is no longer raised.

3. The method of claim 1 wherein the indicating that the execution thread needs a higher priority is performed in response to the execution thread entering the critical code section, and wherein the critical code section utilizes a shared system resource.

* * * * *